(12) United States Patent
Cui

(10) Patent No.: US 8,791,963 B2
(45) Date of Patent: Jul. 29, 2014

(54) RESPONDING TO THE RECEIPT OF ZOOM COMMANDS

(75) Inventor: Yanqing Cui, Helsinki (FI)

(73) Assignee: Nokia Corporation, Espoo (FI)

( * ) Notice: Subject to any disclaimer, the term of this patent is extended or adjusted under 35 U.S.C. 154(b) by 461 days.

(21) Appl. No.: 12/915,291

(22) Filed: Oct. 29, 2010

(65) Prior Publication Data

US 2012/0105484 A1 May 3, 2012

(51) Int. Cl.
*G09G 5/00* (2006.01)
*G06T 3/40* (2006.01)

(52) U.S. Cl.
CPC .................................... *G06T 3/40* (2013.01)
USPC .......................................................... 345/660

(58) Field of Classification Search
CPC .......................................................... G06T 3/40
USPC .......................................................... 345/660
See application file for complete search history.

(56) References Cited

U.S. PATENT DOCUMENTS

| | | |
|---|---|---|
| 7,487,447 B1 | 2/2009 | Jerger |
| 2005/0125826 A1* | 6/2005 | Hunleth et al. ................. 725/45 |
| 2006/0156228 A1* | 7/2006 | Gallo et al. .................... 715/523 |
| 2007/0024646 A1 | 2/2007 | Saarinen et al. |
| 2009/0058884 A1 | 3/2009 | Li et al. |
| 2009/0177538 A1* | 7/2009 | Brewer et al. ................... 705/14 |
| 2009/0198767 A1* | 8/2009 | Jakobson et al. ............. 709/203 |
| 2012/0008916 A1* | 1/2012 | Lane .............................. 386/241 |

FOREIGN PATENT DOCUMENTS

| | | |
|---|---|---|
| EP | 1764676 A1 | 3/2007 |
| EP | 1868073 A1 | 12/2007 |
| JP | 2004157869 A | 6/2004 |
| WO | 0177907 A2 | 10/2001 |
| WO | 2008051468 A2 | 5/2008 |
| WO | 2008085738 A1 | 7/2008 |
| WO | 2009089166 A2 | 7/2009 |

OTHER PUBLICATIONS

International Search Report of PCT/IB2011/054142, dated Jan. 20, 2012.

* cited by examiner

*Primary Examiner* — David T Welch
(74) *Attorney, Agent, or Firm* — Banner & Witcoff, Ltd.

(57) ABSTRACT

Apparatus comprises at least one processor and at least one memory, having stored thereon computer-readable code, the at least one processor being configured under the control of the computer-readable code to cause primary content to be displayed on a display with a first magnification level, to be responsive to an indication of a receipt of a first zoom command, the first zoom command being for causing alteration of the magnification level from the first magnification level to a second magnification level, to determine if the second magnification level is beyond a threshold magnification level, if it is determined that the second magnification level is not beyond the threshold magnification level, to cause the primary content to be displayed on the display with the second magnification level, and if it is determined that the second magnification level is beyond the threshold magnification level, to cause a first set of one or more additional information items relating to the primary content to be displayed on the display in addition to the primary content.

25 Claims, 5 Drawing Sheets

RESPONDING TO THE RECEIPT OF ZOOM COMMANDS

FIELD

This specification relates to responding to the receipt of zoom commands.

BACKGROUND

Users of portable electronic devices such as mobile phones are using their devices with increasing regularity to view diverse content such as internet pages, photographs and documents. It is generally desired to improve the usability of devices such as mobile phones.

SUMMARY

According to a first aspect, this specification describes apparatus comprising at least one processor at least one memory, having stored thereon computer-readable code, the at least one processor being configured under the control of the computer-readable code: to cause primary content to be displayed on a display with a first magnification level; to be responsive to an indication of a receipt of a first zoom command, the first zoom command being for causing alteration of the magnification level from the first magnification level to a second magnification level, to determine if the second magnification level is beyond a threshold magnification level; if it is determined that the second magnification level is not beyond the threshold magnification level, to cause the primary content to be displayed on the display with the second magnification level; and if it is determined that the second magnification level is beyond the threshold magnification level, to cause a first set of one or more additional information items relating to the primary content to be displayed on the display in addition to the primary content.

According to a second aspect, this specification describes a method comprising: causing primary content to be displayed on a display with a first magnification level; responding to an indication of a receipt of a first zoom command, the first zoom command being for causing alteration of the magnification level from the first magnification level to a second magnification level, by determining if the second magnification level is beyond a threshold magnification level; if it is determined that the second magnification level is not beyond the threshold magnification level, causing the primary content to be displayed on the display with the second magnification level; and if it is determined that the second magnification level is beyond the threshold magnification level, causing a first set of one or more additional information items relating to the primary content to be displayed on the display in addition to the primary content.

According to a third aspect, this specification describes a non-transitory computer-readable storage medium having stored thereon computer-readable code, which, when executed by computing apparatus, causes the computing apparatus: to cause primary content to be displayed on a display with a first magnification level; to be responsive to an indication of a receipt of a first zoom command, the first zoom command being for causing alteration of the magnification level from the first magnification level to a second magnification level, to determine if the second magnification level is beyond a threshold magnification level; if it is determined that the second magnification level is not beyond the threshold magnification level, to cause the primary content to be displayed on the display with the second magnification level; and if it is determined that the second magnification level is beyond the threshold magnification level, to cause a first set of one or more additional information items relating to the primary content to be displayed on the display in addition to the primary content.

According to a fourth aspect, this specification describes computer-readable code, which when executed by computing apparatus causes the computing apparatus to perform a method according to the second aspect.

According to a fifth aspect, this specification describes apparatus comprising: means for causing primary content to be displayed on a display with a first magnification level; means for responding to an indication of a receipt of a first zoom command, the first zoom command being for causing alteration of the magnification level from the first magnification level to a second magnification level, by determining if the second magnification level is beyond a threshold magnification level; means for causing the primary content to be displayed on the display with the second magnification level, if it is determined that the second magnification level is not beyond the threshold magnification level; and means for causing a first set of one or more additional information items relating to the primary content to be displayed on the display in addition to the primary content, if it is determined that the second magnification level is beyond the threshold magnification level.

BRIEF DESCRIPTION OF THE FIGURES

For a more complete understanding of example embodiments of the present invention, reference is now made to the following description taken in connection with the accompanying drawings in which.

DETAILED DESCRIPTION OF THE EMBODIMENTS

Figure 1:
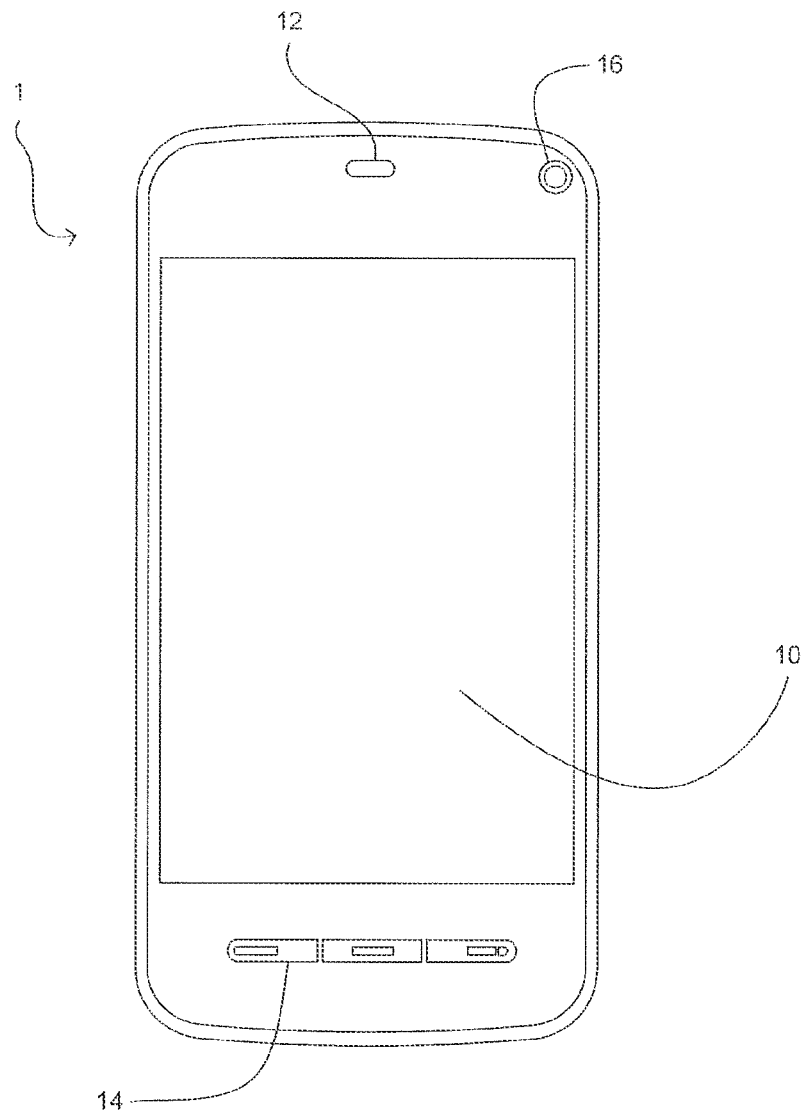
FIG. 1 is an electronic device in which apparatus according to example embodiments of the invention may be provided.

In the description and drawings, like reference numerals refer to like elements throughout.

FIG. 1 illustrates an electronic device 1 in which apparatus according to example embodiments of the invention may be provided. In the example of FIG. 1, the electronic device 1 is a portable electronic device 1. More specifically, the electronic device 1 is a mobile telephone 1. The electronic device 1 comprises a user-interface 10. The user interface 10 is operable to receive user inputs. In this example, the user interface 10 comprises a touch-sensitive display, or a touch-screen 10. As such, in addition to receiving user inputs, the user interface 10 is operable also to display images for consumption by the user.

The electronic device 1 also comprises a loudspeaker 12 for outputting audio signals to the user. In the example of FIG. 1, the electronic device additionally comprises a plurality of depressible hardware keys 14, and a camera 16 for recording image data. It will be understood that the electronic device 1 also comprises components, such as a controller and one or more memories which are not externally visible.

In the example of FIG. 1, the electronic device 1 is a mobile telephone. However, it will be understood from the following description that the electronic device 1 may of another type such as, but not limited to, a digital audio player, an e-reader, and a PDA. Similarly, although in the example of FIG. 1 the user-interface 10 comprises a touchscreen, it will be understood that in different example embodiments the user interface may comprise, for example, one or more physical keys, a scroll wheel, a track ball, a touch pad, a dial or any combination of these. In such alternative example embodiments, the electronic device 1 may also comprise a separate non-touch-sensitive display for providing images and visual information to the user.

Figure 2:
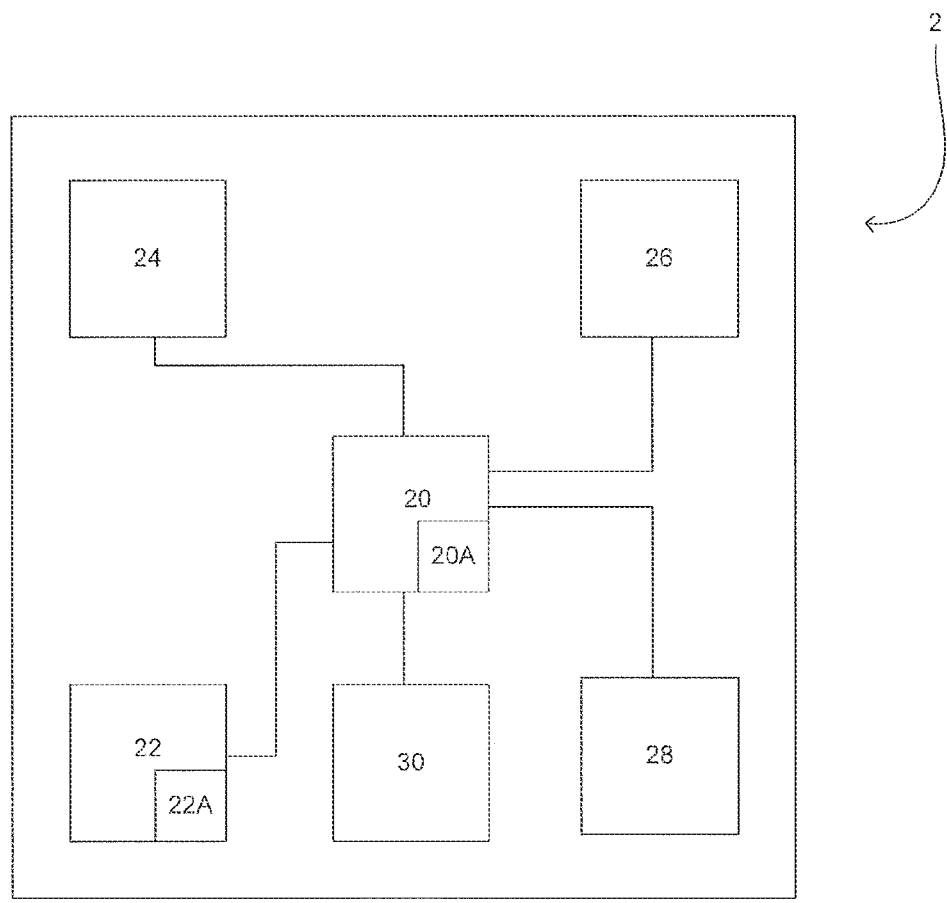
FIG. 2 is a simplified schematic of apparatus according an example embodiment of the invention.

FIG. 2 is electronic apparatus 2 according to example embodiments of the invention. The electronic apparatus 2 comprises a controller 20 and at least one memory 24.

The controller 20 includes one or more processors 20A. The one or more processors 20A operate under the control of computer-readable code 22A, particularly an operating system and additional software, middleware or firmware modules, and software applications. The computer-readable code 22A is stored in the at least one memory 22. The controller 20 may also comprise one or more application specific integrated circuits (ASICs) (not shown). The at least one memory 22 may comprise one or more non-transitory memory media, such as but not limited to ROM, RAM and EEPROM or any combination thereof.

The controller 20 is operable to cause stored data to be retrieved from the at least one memory 22. The controller 20 is operable also to cause data to be stored in the at least one memory 22.

In the example of FIG. 2, the apparatus 2 also comprises a display 24 for displaying content and information, in the form of images, text and video, to the user. The controller 20 is configured under the control of the computer-readable code 22A to control, by signals passed from the controller 20 to the display 24, the content and information displayed on the display 24.

The apparatus 2 also comprises a user interface 26 for receiving user inputs and passing signals indicative of such to the controller 20. In the example of a touchscreen device, such as that depicted in FIG. 1, the user interface 26 may be touch sensitive transducer for detecting incidences of touch inputs on the touchscreen. According to other examples, the user interface may comprise, but is not limited to, a plurality of depressible hardware keys, a scroll wheel, a track ball, a slider, and an accelerometer or any other means suitable for receiving user inputs.

The apparatus 2 is operable to receive zoom commands via the user interface 26. That is to say, the apparatus 2 is operable to recognise particular user inputs (zoom commands) as indications that the user wishes to alter the magnification level of an image displayed on the display 24. The apparatus 2 is configured to recognise a zoom-in command which indicates that the user wishes to cause the magnification level of content displayed on the display 24 to be increased. The apparatus 2 is configured also to recognise a zoom-out command which indicates that the user wishes to cause the magnification of content displayed on the display 24 to be reduced.

The zoom commands may be provided by the user in many different ways. In example embodiments which are provided in a touchscreen device, such as that in FIG. 1, particular tactile gestures may be recognised as zoom commands. For example, a pinching tactile gesture (i.e. the sliding of two of the user's fingers along the surface of the touchscreen towards one another) may be recognised as a zoom-out command, and a reverse-pinching gesture (i.e. the sliding of two of the user's fingers along the surface of the touch screen in a direction away from one another) may be recognised as a zoom-in command. Alternatively, the zoom-in and zoom-out commands may be provided by applying a tactile input to virtual buttons presented on the touchscreen or in any other suitable way. In examples in which the device does not include a touchscreen, the zoom commands may be provided, for example, by depressing hardware keys, scrolling a scroll wheel or a track ball, sliding a slider, or a combination of these. Other types of inputs, such as shaking, tilting or squeezing a device, may also be used to provide zoom commands.

The controller 20 is operable, under the control of the computer-readable code, to determine based on the signals received from the user interface 26 that a zoom command has been received. The controller 20 is operable also to determine the type of the received zoom command (i.e. whether it is a zoom-in command or a zoom-out command). The controller 20 is operable to cause the magnification level at which content and information are displayed on the display 24 to be altered in response to receiving from the user interface 26 a signal indicative of a zoom command.

In the example of FIG. 2, the apparatus 2 also comprises a transceiver 28 for transmitting and receiving data via radio frequency signals. Thus, the apparatus is able to communicate with networks such as the Internet and telephone networks. The controller 20 is operable to cause data that is received via the transceiver 28 to be displayed on the display 24.

According to some embodiments, the apparatus 2 may also comprise an audio player 30. The audio player 30 is operable to cause data stored in the memory 22 to be provided via an audio output such as a loudspeaker or an audio socket (neither shown).

FIGS. 3A to 3D illustrate a first example operation performed by apparatus according to example embodiments of the invention. FIGS. 3A to 3D are simplified illustrations of the content and information that are caused to be displayed on the display 24 throughout the operation.

Figure 3A:
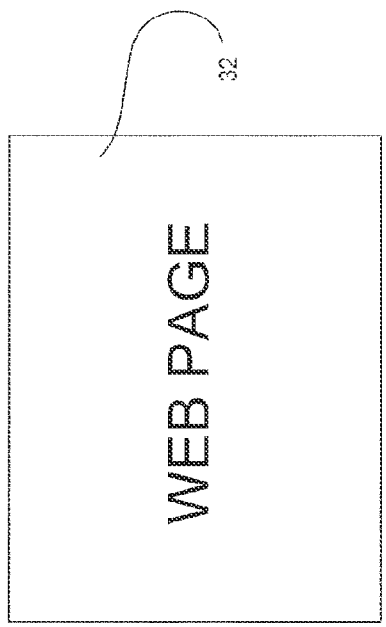
FIGS. 3A to 3D illustrate a first example operation performed by apparatus according example embodiments of the invention.

In FIG. 3A, an internet page 32, which includes information derived from data received via the transceiver 28, is caused to be displayed on the display 24. The magnification level at which the internet page 32 is displayed, is such that only a portion, and not all, of the internet page 32 is visible on the display 24. The controller 20 is aware of the current magnification level. For example, the controller 20 may maintain a magnification level field (not shown) within the memory 22, which may be updated to contain the current magnification level each time a zoom command is received and implemented.

Figure 3B:
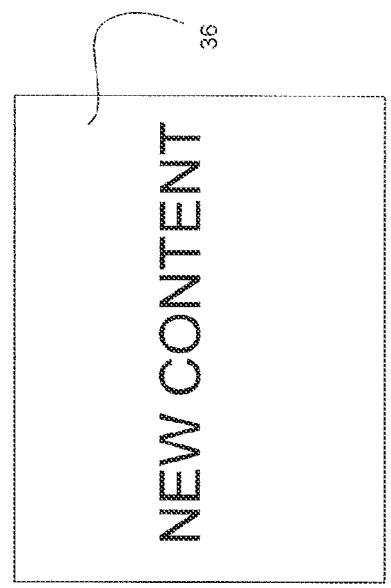

FIG. 3B shows the display 24 following receipt of a zoom-out command. The controller 20 is responsive to the receipt of the zoom command (in this instance a zoom-out command) to check the current magnification level, for example, based on information in the magnification level field in the memory 22. The controller 20 then uses the current magnification level to determine if alteration in accordance with the received zoom-command of the magnification level from the current magnification level would result in a new magnification level that is beyond a threshold magnification level. The threshold level for the minimum magnification (the zoom-out threshold) may be, for example, a level at which all the information of the primary content (i.e. the content currently being viewed) is present on the display 24.

In FIG. 3A, the magnification level at which the internet page 32 is displayed, is such that only a portion, and not all, of the internet page 32 is visible on the display 24. Consequently, subsequent to receiving a zoom-out command, the controller 20 determines that altering the magnification level in accordance with the received command would not result in a magnification level that is beyond the threshold magnification level. The controller 20 is responsive to this determination to alter the magnification level of the internet page 32 in accordance with the received zoom command. Thus, the controller 20 responds to the receipt of the zoom-out command by reducing the magnification level of the internet page 32.

Figure 3C:

FIG. 3C shows the display 24 following subsequent receipt of another zoom-out command. Upon receipt of this command, the controller 20 determines whether alteration of the magnification level in accordance with the received zoom command would result in a new magnification level that is beyond the threshold level. In FIG. 3B, the internet page 32 is displayed at its lowest possible magnification level such that the entire page is visible on the display 24. As such, the controller 20 determines that alteration of the current magnification level would result in a new level that is beyond the threshold level. In response to this determination, the controller 20 does not alter the magnification level any further but instead causes one or more additional information items 34 to be displayed on the display 24. The additional information items 34 are not part of the internet page 32, but are related to the content of the internet page 32.

The one or more additional information items 34 may include, but are not limited to: a link to a downloadable mobile application (an 'app') that is related to the currently viewed internet page; URLs recommended by the currently displayed internet page; links to other internet pages of a similar context which are often viewed by the user of the apparatus; links to popular internet pages viewed by other people who also view the currently displayed internet page; links to internet pages of users (for example, on social networking websites) who link to, or comment on the currently displayed internet page; other internet pages similar to the currently displayed internet page; links to interests and activities of other users who visit the currently displayed internet page; links to content stored within the memory 22 of the apparatus 2 that is related to the currently displayed internet page; and links to geographically proximate services (shops etc) that relate to the currently displayed internet page.

In general, the additional information items 34 are items that may be of interest to the user, and are determined based on the primary content that is currently being viewed by the user. The additional information items 34 may be collated from many different locations and in many different ways. For example, the link to the mobile application may be provided by the service provider of the currently displayed page.

The links to other internet pages that the user of the apparatus often views may be determined and provided by the apparatus 2 based on the user's browsing history. The links to other internet pages that are similar to the currently displayed internet page may be provided by third party servers. The geographically proximate services relating to the currently displayed page may be determined by comparing a location of the service (provided by a third party service) with a current location of the apparatus 20 determined using Cell ID or GPS.

Although the above examples of the additional information items 34 are, in general, links to allow the user easily to access secondary content 36 that is related to the primary content, it will be appreciated that the additional information items 34 may alternatively be of other types. For example, one or more of the additional information items 34 may be information, such as metadata, that is related to the currently viewed primary content.

In the example of FIG. 3C, the additional information items 34 are overlaid on a left-hand side of the internet page 32. However, the additional information items 34 may be provided in any suitable way. For example, the additional information items 34 may be displayed at any of the other edges or may be provided in a window at the centre of the display 24. The additional information items 34 may be caused to appear on the display 24 in any suitable way, for example by fading or sliding into view.

According to alternative example embodiments, the position of the primary content (i.e. the internet page 32) on the display 24 may be translated so as to make room on the display 24 for the additional information items 34. In such embodiments, the magnification level of the primary content is maintained, but a portion of the primary content is may become invisible to the user as it is translated to a position that is outside of the area of the display 24.

Figure 3D:
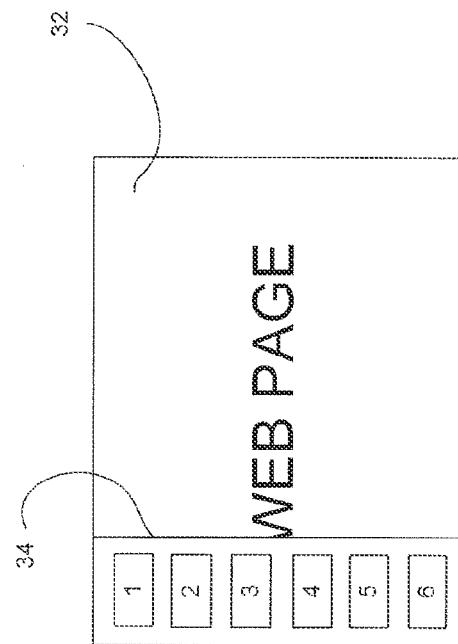

FIG. 3D shows the display following selection by the user of one of the additional information items 34, which is in this example a link to secondary content 36.

Although not shown in FIGS. 3A to 3D, the controller 20 may, when the one or more additional information items 34 are displayed, be responsive to receipt of a zoom-in command to cause the one or more additional information items to be removed from the display 43. In other words, the controller 20 may be responsive to receipt of a zoom command of a type which is opposite to that which caused the controller 20 to cause the additional information items 34 to be displayed, to cause the additional information items to be removed from the display 24.

According to some example embodiments, the controller 20 may be operable, at the stage shown in FIG. 3C, to respond to receipt of another zoom-out command by displaying a second different set of one or more additional information items. The second set of additional information items may be more or less relevant to the primary content currently displayed on the display 24 than was the first previous set. In one example embodiment, the controller 20 is operable to respond to receipt of the zoom-out command, when the first set of additional information items is already displayed, by causing the replacement of the first set with a second set of additional information items that are less strongly related to primary content than was the first set 38. In this way, input of the zoom-out command causes the expansion the "range" of the additional information provided to the user, by making it less relevant to the primary content. Thus, the use of the zoom-out command in this way is analogous to its conventional use of expanding the view of primary content displayed on the display 34.

FIGS. 4A to 4D illustrate a second example operation performed by apparatus according to example embodiments of the invention. FIGS. 4A to 4D are simplified illustrations of the content and information that are caused to be displayed on the display 24 throughout the operation.

Figure 4A:
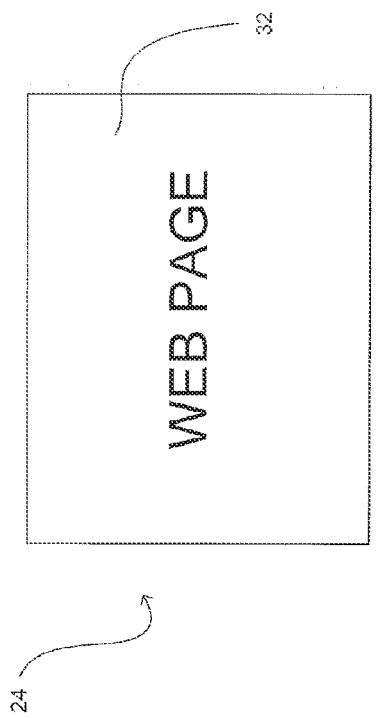
FIGS. 4A to 4D illustrate a second example operation performed by apparatus according example embodiments of the invention.

In FIG. 4A, an internet page 32 is caused to be displayed on the display 24. In FIG. 4A, the current magnification level is such that the entire internet page 32 is visible on the display 24.

Figure 4B:
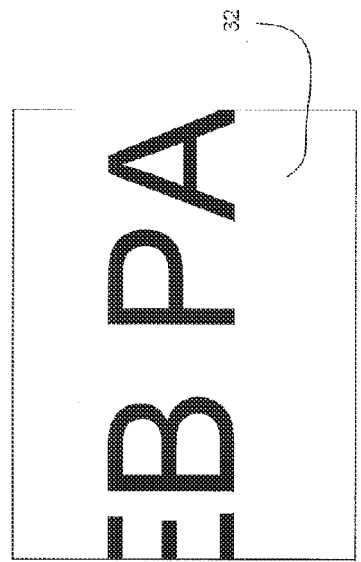

FIG. 4B shows the state of the display 24 following receipt of a zoom-in command. The controller 20 responds to the receipt of the zoom-in command by determining whether the alteration of the magnification level in accordance with the received zoom command would result in a new magnification level that is beyond a threshold magnification level. The threshold level for the maximum magnification may be, for example, a level at which the primary content is magnified to such an extent that individual pixels of the primary content are easily discernable from one another or such that single words are no longer able to fit on the display. As is clear from FIG. 4B, the controller 20 determines that the alteration of the magnification level in accordance with the received zoom command would not result in a magnification level that is beyond a threshold magnification level, and so alters the magnification level in accordance with the zoom-in command. As such, in FIG. 4B, the magnification level is increase such that some but not all of the primary content 34 is visible on the display 24.

Figure 4C:
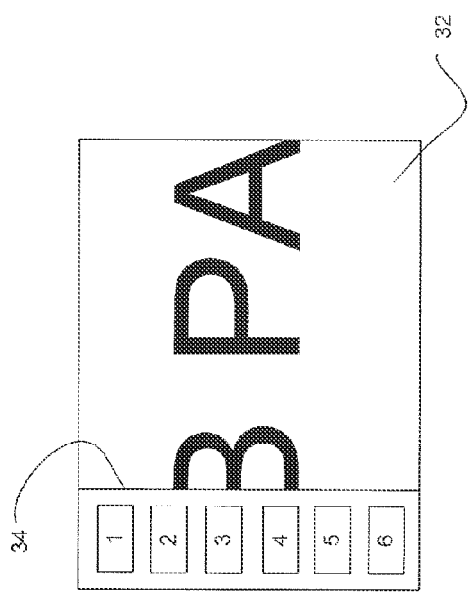

FIG. 4C shows the state of the display 24 following receipt of another zoom-in command. The controller 20 determines the alteration of the magnification level in accordance with the received zoom command would result in a magnification level that is beyond a threshold magnification level and so, instead of zooming-in further, causes one or more additional information items 34 to be displayed on the display 24. The additional information items 34 are as described above with reference to FIG. 3C and may be provided on the display 24 also as described above.

Similarly to the example of FIGS. 3A to 3D, the controller 20 may be operable to respond to receipt of another zoom-in command following the provision of the one or more additional information items 34 by providing a second set of content items that are more (or less) related to the primary content displayed on the display 24.

Also as in the example of FIGS. 3A to 3D, the controller 20 may be responsive to receipt of a zoom command of a different type to that which caused the controller 20 to cause the additional information items 34 to be displayed, to cause the additional information items 34 to be removed from the display 24.

Figure 4D:
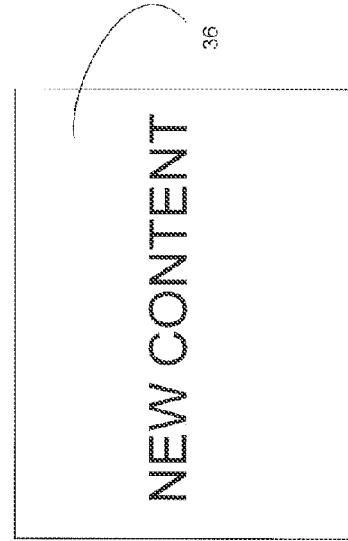

FIG. 4D shows the display 24 following selection of the one of the one or more additional information items.

As will be understood from the above-described example embodiments, the invention provides a new way of providing users with access to information and secondary content related to primary content currently being viewed. Thus, the user experience is improved as the user is able to navigate more quickly and more easily between different content both within the device an on the internet. Furthermore, the invention ensures that the related content is easily accessible via a command that is familiar to the user, but also that the one or more additional information items do not take up space on the display (which is particularly valuable in mobile devices such as mobile telephones etc.) unless the user specifically requests it via input of a zoom command. The invention introduces a new use of the zoom command, which is normally used to enable people to obtain a better view of the currently viewed primary content. In this invention, the zoom command is used to enable easy access to and viewing of content and information which is not part of, but is related to the primary content.

Although the examples of FIGS. 3A to 3D and 4A to 4D have been described separately, it will be appreciated the apparatus according to the invention may be operable to perform both operations.

Example operations according to the invention will now be described with reference to the flow diagram of FIG. 5.

In step S1 the controller 20 causes primary content to be displayed on the display 24.

Next, in step S2, the controller 20 receives an indication of a zoom command, for example a zoom-out command, having been received from a user.

Next in step S3, the controller 20 determines if alteration of the magnification level in accordance with the received zoom command would result in the magnification level that exceeds a threshold level. This may be achieved by checking a current magnification level and a pre-defined threshold value.

If a negative determination is returned in step S3, the operation proceeds to step S4, in which magnification level at which the primary content is displayed on the display 24 is altered in accordance with the received zoom command.

If a positive determination is received in step S3, the operation proceeds to step S5, in which one or more additional information items are caused to be displayed on the display 24 in addition to the primary content. This step may include causing a second set of additional information items to be displayed instead of the first set of additional information items, if the first set is already being displayed when the zoom command is received.

According to some example embodiments, for example those in which the user interface is a touchscreen, a single user input may correspond to multiple zoom commands. For example, where the zoom command is a pinch, or reverse pinch, gesture, the distance over which the user's fingers are slid corresponds to the amount of zoom they wish to be implemented.

Figure 5:
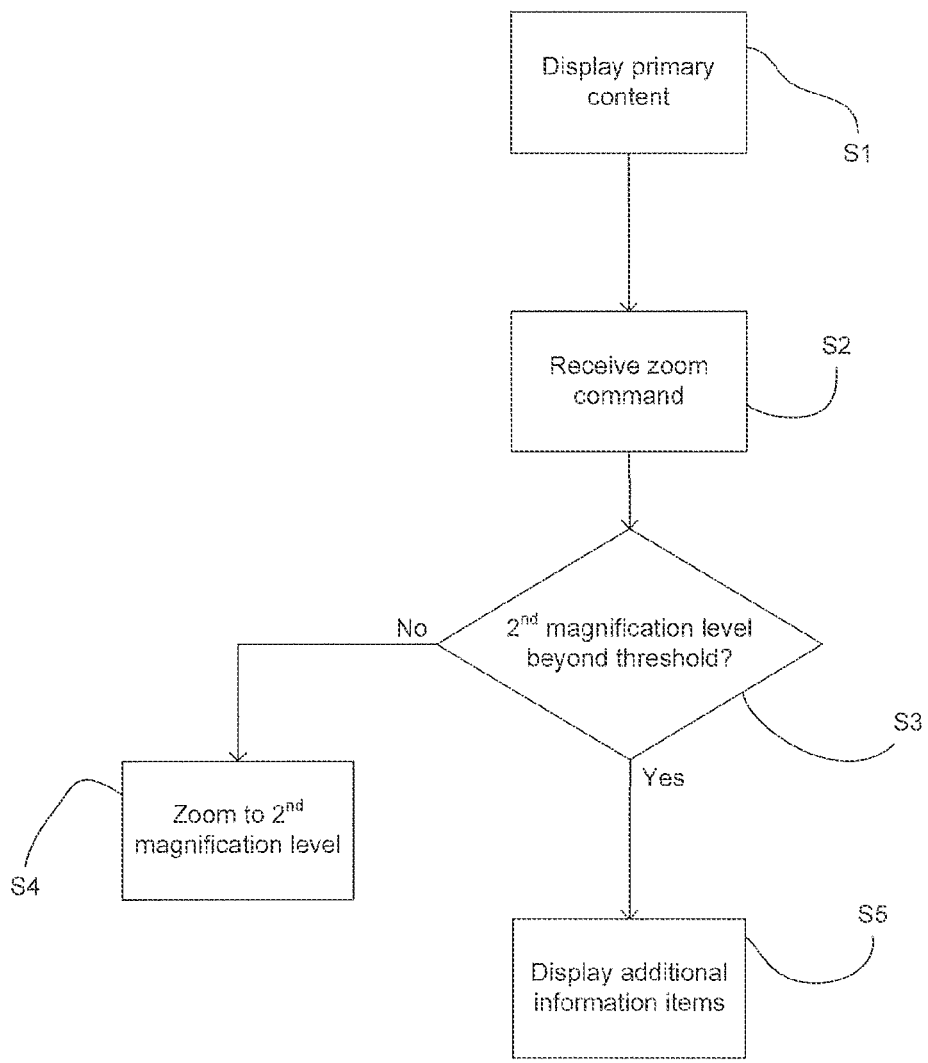
FIG. 5 is a flow chart depicting a method according to example embodiments of the invention.

In such cases, the input may be treated as multiple zoom commands with the operation of FIG. 5 being performed sequentially for each command. As such, if a user input corresponds to four zoom commands, the controller 20 will perform the operation of FIG. 5 sequentially four times. Thus, the controller 20 may alter the magnification level in accordance with the zoom commands until doing so would result in the threshold level being exceeded, at which point it would cause the additional information items to be displayed.

Alternatively, when the threshold is reached during a single user input which includes multiple zoom commands, the controller 20 may be operable to recognise this and not to cause the additional information items to be displayed. Instead, another separate user input may be required in order to cause the additional information items to be displayed. In this way, the additional information items are not displayed by mistake when the user is actually only attempting to cause the primary content to be zoomed in or out to the maximum level.

In the examples above, the primary content is an internet page. It will be appreciated, however, that the primary content may be any other type of zoomable content. For example, the primary content may be a document, such as a PDF or a word processor document, or a photograph. In examples in which the primary content is a document, the one or more additional information items may include: metadata related to the document such as the creator of the document, the date it was created, the date it was last saved etc; links to related documents, for example, other documents with similar titles, other documents created at a similar time or by the same user; and links to internet pages that are relevant to the subject matter of the currently viewed document. In examples in which the primary content is a photograph, the one or more additional content items may be, for example, links to other photos taken in a similar geographic location, the weather when the photo was taken, the favorite music of the photographer, services in geographic proximity to the location at which the photograph was taken, or a link to an internet auction sale of the camera model with which the picture was taken.

In the above described embodiments, when the one or more additional information items are caused to be displayed, the current magnification level of the primary content is maintained. According to some alternative embodiments, however, the magnification level may be changed in accordance with the type of zoom command that is received, in addition to the one or more additional information items being caused to be displayed.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus comprising:
   at least one processor; and
   at least one memory, the at least one memory storing computer-readable code, that when executed by the at least one processor, causes the at least one processor:
      to cause primary content to be displayed on a display with a first magnification level, wherein the primary content comprises a first photograph;
      to be responsive to an indication of a receipt of a first zoom-out command, the first zoom-out command being for causing alteration of the magnification level from the first magnification level to a second magnification level, to determine if the second magnification level is beyond a threshold magnification level; and
      if it is determined that the second magnification level is beyond the threshold magnification level, to cause a first set of one or more additional information items relating to but not part of the primary content to be displayed and simultaneously visible on the display with the primary content,
      wherein the first set of one or more additional information items relating to but not part of the primary content comprises a first set of one or more links to other photographs taken in a similar geographical location to the first photograph, the displayed first set of one or more links to the other photographs being determined based on a geographic location in which the first photograph was taken.

2. Apparatus according to claim 1, the at least one memory storing the computer-readable code that, when executed by the at least one processor, causes the at least one processor:
   to cause the first set of one or more additional information items to be overlaid on the primary content.

3. Apparatus according to claim 1, the at least one memory storing the computer-readable code that, when executed by the at least one processor, causes the at least one processor:
   subsequent to causing the first set of one or more additional information items to be displayed, to be responsive to an indication of a receipt of a second zoom-out command to cause a second set of one or more additional information items not part of the primary content to be displayed and simultaneously visible on the display with the primary content.

4. Apparatus according to claim 1, the at least one memory storing the computer-readable code that, when executed by the at least one processor, causes the at least one processor:
   subsequent to causing the first set of one or more additional information items to be displayed, to be responsive to an indication of a receipt of a zoom-in command to cause the first set of one or more additional information items to be removed from the display.

5. Apparatus according to claim 1, wherein the one or more additional information items comprise at least one link to secondary content.

6. A mobile terminal comprising the apparatus of claim 1.

7. Apparatus according to claim 1, wherein the primary content is a webpage.

8. Apparatus according to claim 1, wherein to cause the first set of one or more additional information items relating to but not part of the primary content to be displayed on the display in addition to the primary content comprises:
   to cause the first set of one or more additional information items relating to but not part of the primary content to be displayed on the display in addition to the primary content instead of altering the magnification level.

9. Apparatus according to claim 1, wherein the displayed first set of one or more additional information items is determined based on a geographic location associated with the primary content.

10. Apparatus according to claim 1, wherein the at least one memory storing computer-readable code, that when executed by the at least one processor, causes the at least one processor:
    subsequent to causing the first set of one or more additional information items to be displayed, to be responsive to an indication of a receipt of a second zoom-out command to cause a second set of one or more additional information items not part of the primary content to be displayed and simultaneously visible on the display with the primary content.

11. Apparatus according to claim 10, wherein the second set of one of more additional information items are less strongly related to the primary content than the first set of one or more additional information items.

12. Apparatus according claim 11, wherein the second set of one or more additional information items comprises a second set of one or more links to other photographs.

13. Apparatus according to claim 1, the at least one memory storing computer-readable code, that when executed by the at least one processor, causes the at least one processor to alter the magnification level from the first magnification level to the second magnification level if it is determined that the second magnification level is not beyond the threshold magnification level instead of causing display of the first set of one or more additional information items relating to the primary content.

14. A method comprising:
    causing primary content to be displayed on a display with a first magnification level, wherein the primary content comprises a first photograph;
    responding to an indication of a receipt of a first zoom-out command, the first zoom-out command being for causing alteration of the magnification level from the first magnification level to a second magnification level; and
    if it is determined that the second magnification level is beyond a threshold magnification level, causing a first set of one or more additional information items relating to but not part of the primary content to be displayed and simultaneously visible on the display with the primary content,
    wherein the first set of one or more additional information items relating to but not part of the primary content comprises a first set of one or more links to other photographs taken in a similar geographical location to the first photograph, the displayed first set of one or more links to the other photographs being determined based on a geographic location in which the first photograph was taken.

15. A method according to claim 14, comprising:
causing the first set of one or more additional information items to be overlaid on the primary content.

16. A method according to claim 14, comprising:
subsequent to causing the first set of one or more additional information items to be displayed, responding to an indication of a receipt of a second zoom-out command by causing a second set of one or more additional information items not part of the primary content to be displayed and simultaneously visible on the display with the primary content.

17. A method according to claim 14, comprising:
subsequent to causing the first set of one or more additional information items to be displayed, responding to an indication of a receipt of a zoom-in command by causing the first set of one or more additional information items to be removed from the display.

18. A method according to claim 14, wherein the primary content is a webpage.

19. A method according to claim 14, wherein the one or more additional information items comprise at least one link to secondary content.

20. A non-transitory computer-readable storage medium storing computer-readable code, which, when executed by a computing apparatus, causes the computing apparatus:
to cause primary content to be displayed on a display with a first magnification level, wherein the primary content comprises a first photograph;
to be responsive to an indication of a receipt of a first zoom-out command, the first zoom-out command being for causing alteration of the magnification level from the first magnification level to a second magnification level; and
if it is determined that the second magnification level is beyond a threshold magnification level, to cause a first set of one or more additional information items relating to but not part of the primary content to be displayed and simultaneously visible on the display with the primary content,
wherein the first set of one or more additional information items relating to but not part of the primary content comprises a first set of one or more links to other photographs taken in a similar geographical location to the first photograph, the displayed first set of one or more links to the other photographs being determined based on a geographic location in which the first photograph was taken.

21. A non-transitory computer-readable storage medium according to claim 20, wherein the computer-readable code causes the computing apparatus:
to cause the first set of one or more additional information items to be overlaid on the primary content.

22. A non-transitory computer-readable storage medium according to claim 20, wherein the computer-readable code causes the computing apparatus:
subsequent to causing the first set of one or more additional information items to be displayed, to be responsive to an indication of a receipt of a second zoom-out command to cause a second set of one or more additional information items not part of the primary content to be displayed and simultaneously visible on the display with the primary content.

23. A non-transitory computer-readable storage medium according to claim 20, wherein the computer-readable code causes the computing apparatus:
subsequent to causing the first set of one or more additional information items to be displayed, to be responsive to an indication of a receipt of a zoom-in command to cause the first set of one or more additional information items to be removed from the display.

24. A non-transitory computer-readable storage medium according to claim 20, wherein the primary content is a webpage.

25. A non-transitory computer-readable storage medium according to claim 20, wherein the one or more additional information items comprise at least one link to secondary content.

* * * * *

UNITED STATES PATENT AND TRADEMARK OFFICE
CERTIFICATE OF CORRECTION

| | | |
|---|---|---|
| PATENT NO. | : 8,791,963 B2 | Page 1 of 1 |
| APPLICATION NO. | : 12/915291 | |
| DATED | : July 29, 2014 | |
| INVENTOR(S) | : Yanqing Cui | |

It is certified that error appears in the above-identified patent and that said Letters Patent is hereby corrected as shown below:

In the Claims,

In Column 10, Claim 11, Line 34
    Please delete "one of more" and replace with --one or more--.

Signed and Sealed this
Tenth Day of February, 2015

Michelle K. Lee
*Deputy Director of the United States Patent and Trademark Office*